(12) United States Patent
Miwa

(10) Patent No.: US 10,855,610 B2
(45) Date of Patent: Dec. 1, 2020

(54) INFORMATION PROCESSING APPARATUS, INFORMATION PROCESSING SYSTEM, INFORMATION PROCESSING METHOD, AND STORAGE MEDIUM

(71) Applicant: FUJITSU LIMITED, Kawasaki (JP)

(72) Inventor: Masahiro Miwa, Kawaguchi (JP)

(73) Assignee: FUJITSU LIMITED, Kawasaki (JP)

( * ) Notice: Subject to any disclaimer, the term of this patent is extended or adjusted under 35 U.S.C. 154(b) by 136 days.

(21) Appl. No.: 16/057,865

(22) Filed: Aug. 8, 2018

(65) Prior Publication Data
US 2019/0052573 A1   Feb. 14, 2019

(30) Foreign Application Priority Data
Aug. 14, 2017   (JP) .................. 2017-156659

(51) Int. Cl.
| | | |
|---|---|---|
| *H04L 12/741* | (2013.01) | |
| *H04L 12/805* | (2013.01) | |
| *H04L 12/835* | (2013.01) | |
| *H04L 12/721* | (2013.01) | |
| *H04L 12/707* | (2013.01) | |
| *H04L 12/947* | (2013.01) | |

(52) U.S. Cl.
CPC ............. *H04L 47/36* (2013.01); *H04L 45/22* (2013.01); *H04L 45/70* (2013.01); *H04L 47/30* (2013.01); *H04L 49/25* (2013.01)

(58) Field of Classification Search
CPC ......... H04L 45/22; H04L 45/70; H04L 47/30; H04L 47/36; H04L 49/25
See application file for complete search history.

(56) References Cited

U.S. PATENT DOCUMENTS

| | | | | |
|---|---|---|---|---|
| 4,991,204 A | * | 2/1991 | Yamamoto | H04Q 3/66 340/2.23 |
| 6,167,025 A | * | 12/2000 | Hsing | G01R 31/086 370/216 |
| 6,212,190 B1 | * | 4/2001 | Mulligan | H04L 29/06 370/400 |
| 7,593,321 B2 | * | 9/2009 | Galand | H04L 1/22 370/218 |
| 7,965,626 B2 | * | 6/2011 | Tan | H04L 43/00 370/228 |

(Continued)

FOREIGN PATENT DOCUMENTS

| | | |
|---|---|---|
| JP | 2003-298594 | 10/2003 |
| JP | 2015-12343 | 1/2015 |

*Primary Examiner* — Phuc H Tran
(74) *Attorney, Agent, or Firm* — Fujitsu Patent Center

(57) ABSTRACT

An information processing apparatus includes a memory; and a processor coupled to the memory and configured to determine whether a size of data is equal to a predetermined threshold or less when degradation occurs on a communication path to a destination information processing apparatus of the data; transmit the data to another information processing apparatus different from the destination information processing apparatus and coupled to the destination information processing apparatus when it is determined that the size of the data is more than the predetermined threshold; and transmit the data to the destination information processing apparatus through the communication path when it is determined that the size of the data is the predetermined threshold or less.

17 Claims, 19 Drawing Sheets

(56) References Cited

U.S. PATENT DOCUMENTS

| | | | | |
|---|---|---|---|---|
| 8,060,017 | B2* | 11/2011 | Schlicht | H04L 1/0015 455/41.2 |
| 8,203,956 | B1* | 6/2012 | Milliken | H04L 41/5025 370/230 |
| 9,699,101 | B2* | 7/2017 | Lee | H04L 47/115 |
| 9,806,895 | B1* | 10/2017 | Kommula | H04L 12/1863 |
| 2003/0099195 | A1* | 5/2003 | Lee | H04L 47/30 370/229 |
| 2007/0268827 | A1* | 11/2007 | Csaszar | H04L 43/026 370/232 |
| 2010/0185811 | A1* | 7/2010 | Kwon | G06F 12/0246 711/105 |
| 2013/0100797 | A1* | 4/2013 | Ray | H04L 45/22 370/216 |
| 2015/0180766 | A1* | 6/2015 | Racz | H04W 28/04 370/218 |
| 2017/0085491 | A1* | 3/2017 | Mosko | H04L 47/32 |
| 2018/0069790 | A1* | 3/2018 | Mitsumori | H04L 45/74 |
| 2018/0109966 | A1* | 4/2018 | Alexander | H04W 24/04 |
| 2018/0212792 | A1* | 7/2018 | Brandt | H04W 52/0219 |

\* cited by examiner

FIG. 5

| JOB NAME | NAME OF NODE FOR USE | MAXIMUM AMOUNT OF MEMORY | EXECUTION TIME |
|---|---|---|---|
| JOB A | NODE #1, NODE #2 | 100 MB | 20 MINUTES |
| ⋮ | ⋮ | ⋮ | ⋮ |

FIG. 6

| TARGET JOB NAME | RELAY NODE NAME | BUFFER SIZE |
|---|---|---|
| JOB A | NODE #3 | 100 MB |
| ⋮ | ⋮ | ⋮ |

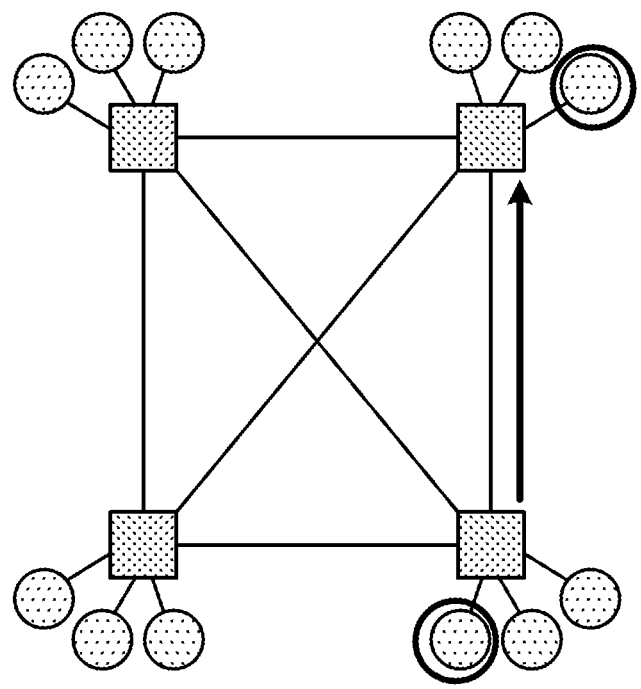
FIG. 17B
FULL-MESH TOPOLOGY
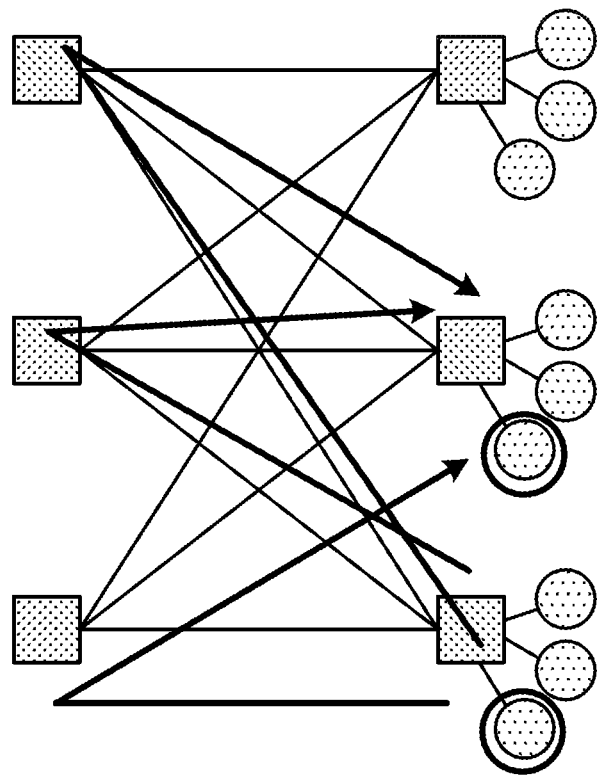
FIG. 17A
FAT-TREE TOPOLOGY (MULTIPLE PATHS)
REPRESENTS INFORMATION PROCESSING APPARATUS,
REPRESENTS SWITCH.

INFORMATION PROCESSING APPARATUS, INFORMATION PROCESSING SYSTEM, INFORMATION PROCESSING METHOD, AND STORAGE MEDIUM

CROSS-REFERENCE TO RELATED APPLICATION

This application is based upon and claims the benefit of priority of the prior Japanese Patent Application No. 2017-156659, filed on Aug. 14, 2017, the entire contents of which are incorporated herein by reference.

FIELD

The embodiment discussed herein is related to an information processing apparatus, an information processing system, an information processing method, and a non-transitory computer-readable storage medium.

BACKGROUND

An information processing system referred to as a supercomputer or a computer cluster is implemented by connecting multiple information processing apparatuses on a network. Examples of a connection form of multiple information processing apparatuses include a fat-tree topology and a full-mesh topology.

FIGS. 17A and 17B are diagrams for describing the fat-tree topology and the full-mesh topology. FIG. 17A illustrates an example of the fat-tree topology, and FIG. 17B illustrates an example of the full-mesh topology. In FIGS. 17A and 17B, each circle represents an information processing apparatus, and each square represents a network switch (hereinafter referred to as a switch).

As illustrated in FIG. 17A, in the fat-tree topology, switches each connected to multiple information processing apparatuses are connected to each other via multiple other switches. In the fat-tree topology, multiple communication paths between two information processing apparatuses have the shortest distance.

By contrast, as illustrated in FIG. 17B, in the full-mesh topology, switches each connected to multiple information processing apparatuses are connected to each other by links. In the full-mesh topology, although the minimum number of hops, which is the minimum number of switches through which data passes when information processing apparatuses perform communication, is relatively small, only a single communication path between two information processing apparatuses has the shortest distance.

There is a technique for reliably transmitting a packet to a given destination node by dynamically selecting and generating a link if an established initially set link is blocked on a network where multiple nodes are connected. There is also another technique in which a communication network and a transfer node temporarily switch from a faulty link to a path not connected to the faulty link when link state information is updated, thereby reducing the communication outage time or the packet transfer failure time.

Examples of the related art are Japanese Laid-open Patent Publication Nos. 2003-298594 and 2015-12343.

SUMMARY

According to an aspect of the invention, an information processing apparatus includes a memory; and a processor coupled to the memory and configured to determine whether a size of data is equal to a predetermined threshold or less when degradation occurs on a communication path to a destination information processing apparatus of the data; transmit the data to another information processing apparatus different from the destination information processing apparatus and coupled to the destination information processing apparatus when it is determined that the size of the data is more than the predetermined threshold; and transmit the data to the destination information processing apparatus through the communication path when it is determined that the size of the data is the predetermined threshold or less.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of a job-execution-information management table;

FIG. 6 illustrates an example of a relay node management table;

FIG. 17A is a diagram for describing a fat-tree topology; and

FIG. 17B is a diagram for describing a full-mesh topology.

DESCRIPTION OF EMBODIMENT

The full-mesh topology illustrated in FIG. 17B has a problem in which, if degradation occurs on a communication path, performance degradation of the job that is executed over the communication path also occurs.

In one aspect, the object is to suppress the occurrence of degradation in job performance when degradation occurs on a communication path.

Hereinafter, an embodiment of an information processing apparatus, an information processing system, an information processing method, and a non-transitory computer-readable storage medium disclosed in this application is described in detail with reference to the drawings. It is noted that the embodiment does not limit the technique disclosed herein.

Embodiment

First, message transmission and reception performed by the information processing system according to the embodiment when degradation in a link occurs is described. Degradation in a link occurs, for example, in a case where some lanes fail to operate properly in a multilane link and in a case where a link in use for communication between information processing apparatuses is also used for other communication, thereby causing degradation in the link.

Figure 1:
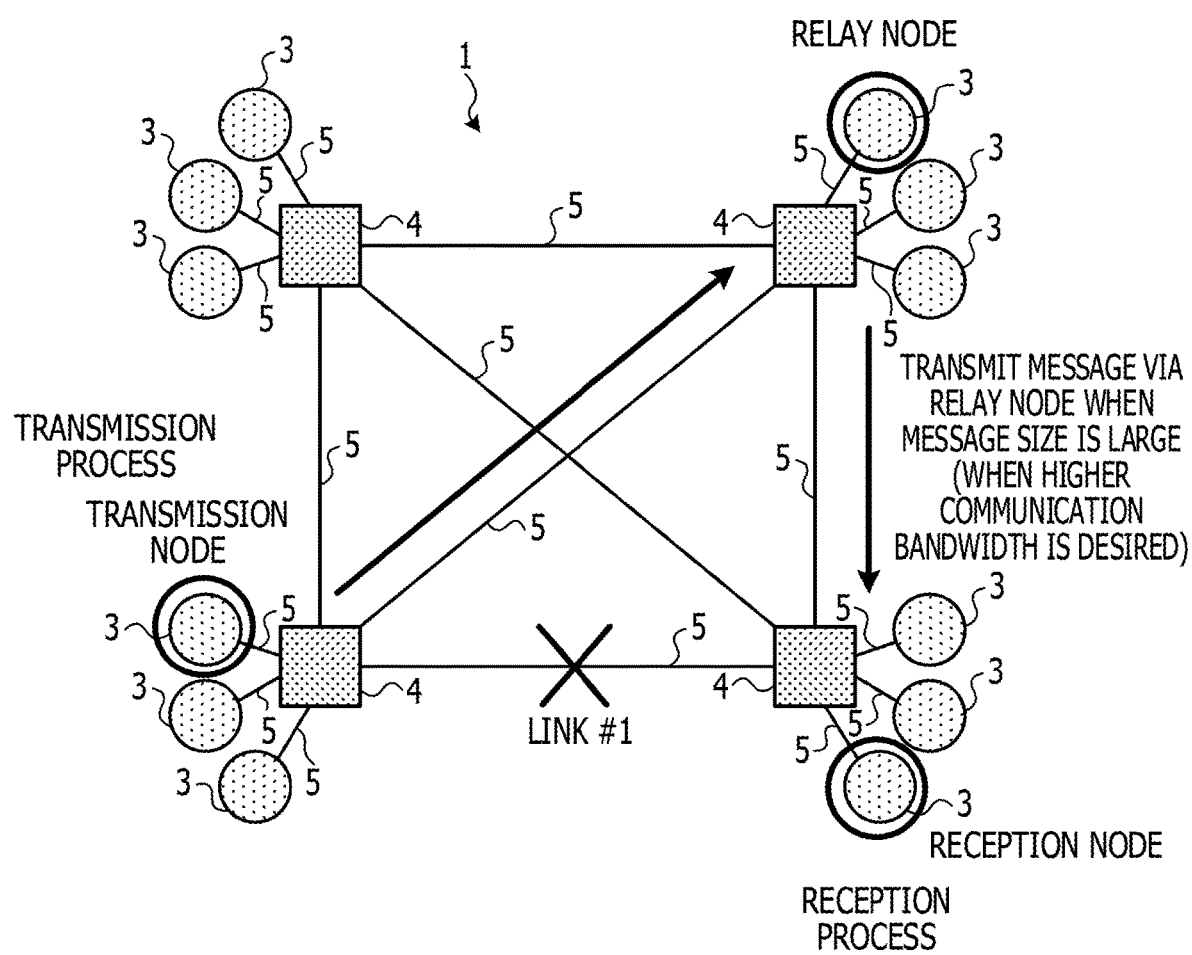
FIG. 1 is a diagram for describing message transmission and reception performed by an information processing system according to an embodiment when degradation occurs in a link.

FIG. 1 is a diagram for describing message transmission and reception performed by the information processing system according to the embodiment when degradation occurs in a link. As illustrated in FIG. 1, an information processing system 1 according to the embodiment includes four switches 4 each connected to three compute nodes 3 by links 5. The compute node 3 is an information processing apparatus. Each of the switches 4 is connected to three switches 4 by the links 5; in other words, the information processing system 1 has a connection form of the full-mesh topology.

It is noted that four switches 4 are depicted here for convenience of description, but the information processing system 1 may include more than four or less than four switches 4. In addition, each of the switches 4 may be connected to more than three or less than three compute nodes 3 by the links 5.

In a case where degradation occurs in the link 5 represented by link #1, a transmission process and a reception process that have performed communication by using the link #1 perform communication via a relay buffer of the compute node 3 represented by a relay node. Here, the transmission process is a process that runs on the compute node 3 represented by a transmission node. The transmission node is connected by the link 5 to the switch 4 that is connected to the link #1. The reception process is a process that runs on the compute node 3 represented by a reception node. The reception node is connected by the link 5 to the other switch 4 that is connected to the link #1.

In a case where a message to be transmitted is relatively small, the transmission process transmits the message to the reception process by using the link #1. An example of a case where the size of a message to be transmitted is relatively small is a case where the size of a message to be transmitted is 512 bytes or less. In contrast, since higher communication bandwidth is desired to transmit a message of large size, the transmission process transmits the message to the reception process via the relay node.

As described above, if degradation occurs in the link 5, in a case where the message size is relatively large, the information processing system 1 performs communication using the link 5 via the relay node. Accordingly, it is unnecessary that the information processing system 1 resets routing when degradation occurs in the link 5, thereby hindering the occurrence of overhead caused by resetting.

Figure 2:
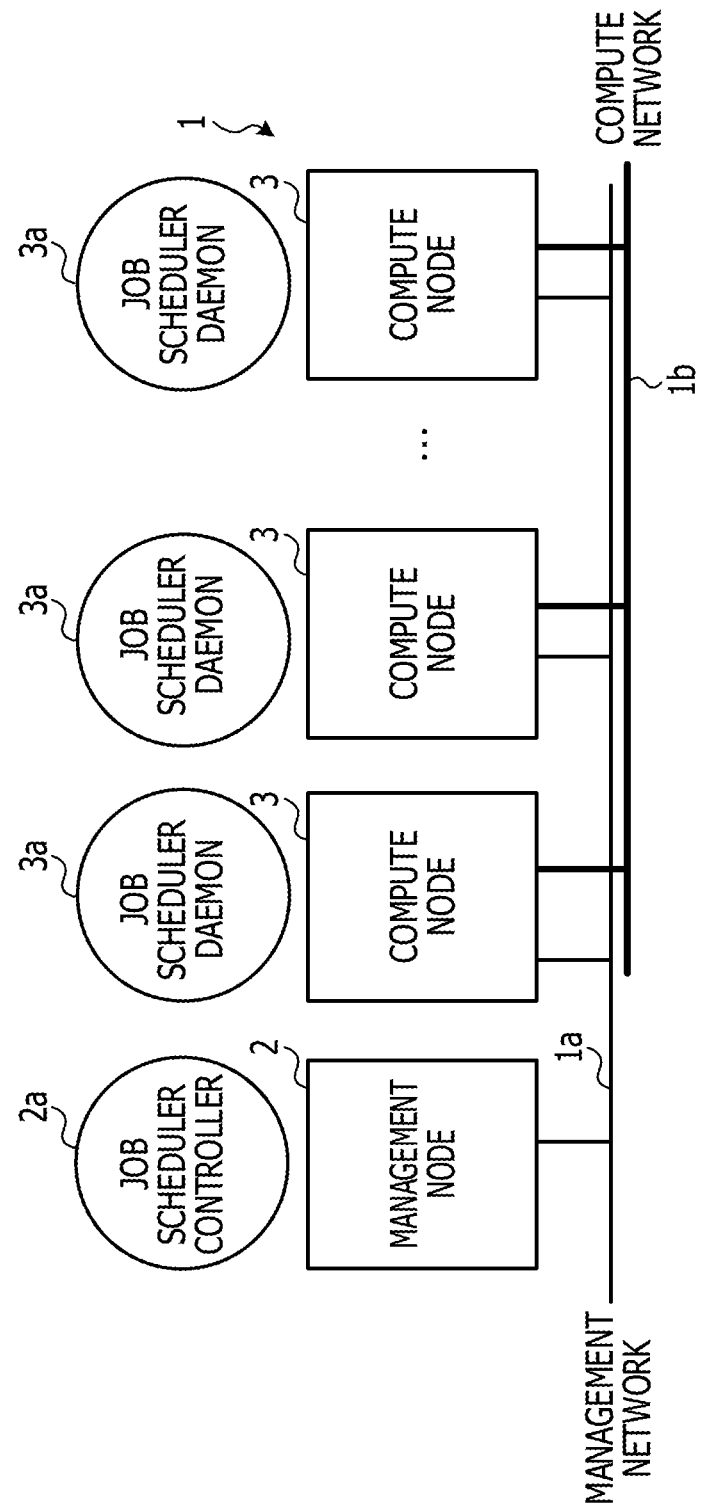
FIG. 2 illustrates a configuration of the information processing system.

Next, a configuration of the information processing system 1 is described. FIG. 2 illustrates a configuration of the information processing system 1. As illustrated in FIG. 2, the information processing system 1 includes a management node 2 and the multiple compute nodes 3. The management node 2 and the multiple compute nodes 3 are connected to each other by a management network 1a. The multiple compute nodes 3 are connected to each other by a computation network 1b. The computation network 1b is a network of the full-mesh topology illustrated in FIG. 1.

The management node 2 manages the compute nodes 3. A job scheduler controller 2a runs on the management node 2. The job scheduler controller 2a receives a job from a user, assigns the job to the compute node 3, and requests the compute node 3 to execute the job. A job scheduler daemon 3a runs on each of the compute nodes 3. The job scheduler daemon 3a receives the request for job execution from the job scheduler controller 2a and executes the job.

In FIG. 2, the job scheduler controller 2a runs on the management node 2, but the job scheduler controller 2a may run on any of the compute nodes 3. The job scheduler controller 2a that runs on the compute node 3 may request, by using the computation network 1b, another of the compute nodes 3 to execute a job.

Next, examples of transmission and reception performed by the information processing system 1 using the relay buffer is described with reference to FIGS. 3A to 3F. FIGS. 3A to 3F illustrate examples of transmission and reception performed by the information processing system 1 using the relay buffer.

In FIGS. 3A to 3F, a process #1 is a process for transmitting a message, which corresponds to the transmission process in FIG. 1, and a process #2 is a process for receiving a message, which corresponds to the reception process in FIG. 1. A transmission buffer is a communication buffer used by the process #1 for transmission, and a reception buffer is a communication buffer used by the process #2 for reception. A relay process is a process that runs on the relay node. The relay node is determined by the management node 2 when a job is started as described later.

Figure 3A:
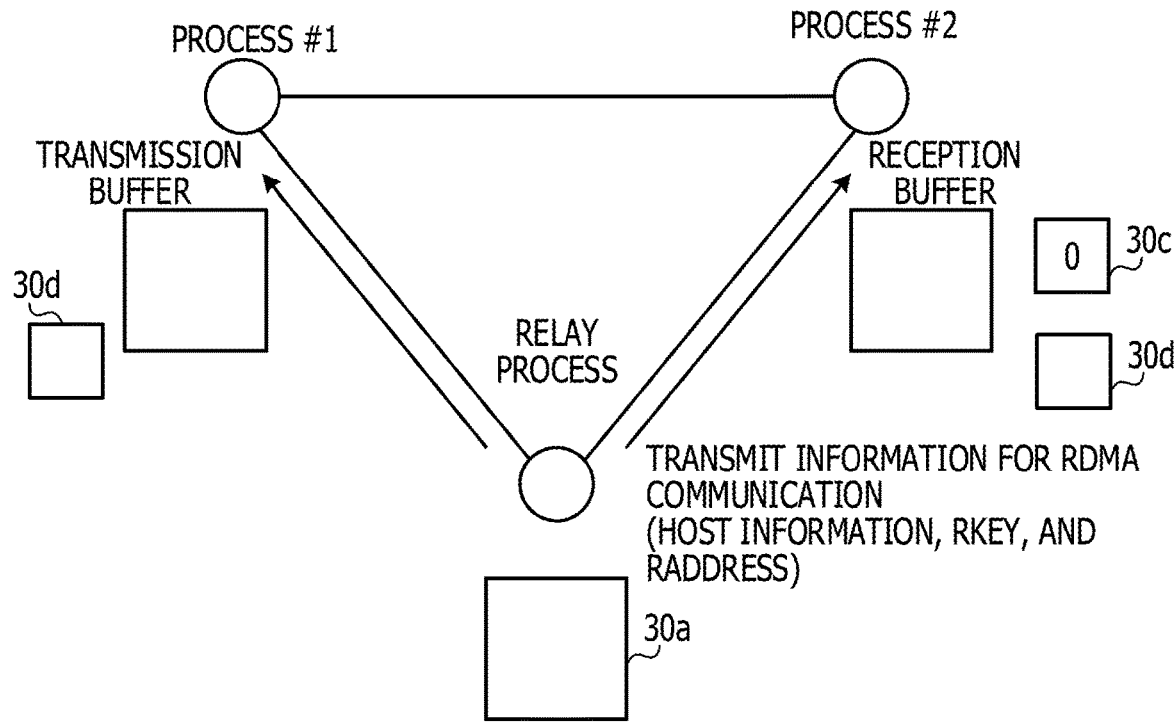
FIG. 3A illustrates an example (initialization) of transmission and reception performed by the information processing system using a relay buffer.

As illustrated in FIG. 3A, at initialization, the relay process obtains a relay buffer 30a and transmits information for remote direct memory access (RDMA) communication to the process #1 and the process #2. Here, the information for RDMA communication contains host information, an Rkey, and an Raddress.

The host information, which is the information about the relay node, is used for accessing the relay node. The host information is, for example, the name of the relay node and the IP address. Rkey is a key that is used for accessing the relay buffer 30a. Raddress is the address of the relay buffer 30a. The process #1 and the process #2 receive the information for RDMA communication and store the information for RDMA communication as relay node information 30d. The process #1 writes a message to the address specified by Raddress in the memory of the relay node specified by the host information with Rkey. The process #2 reads the message from the address specified by Raddress in the memory of the relay node specified by the host information with Rkey. The reception process has a relay flag 30c. The relay flag 30c indicates whether the relay buffer 30a is used for communication.

Figure 3B:
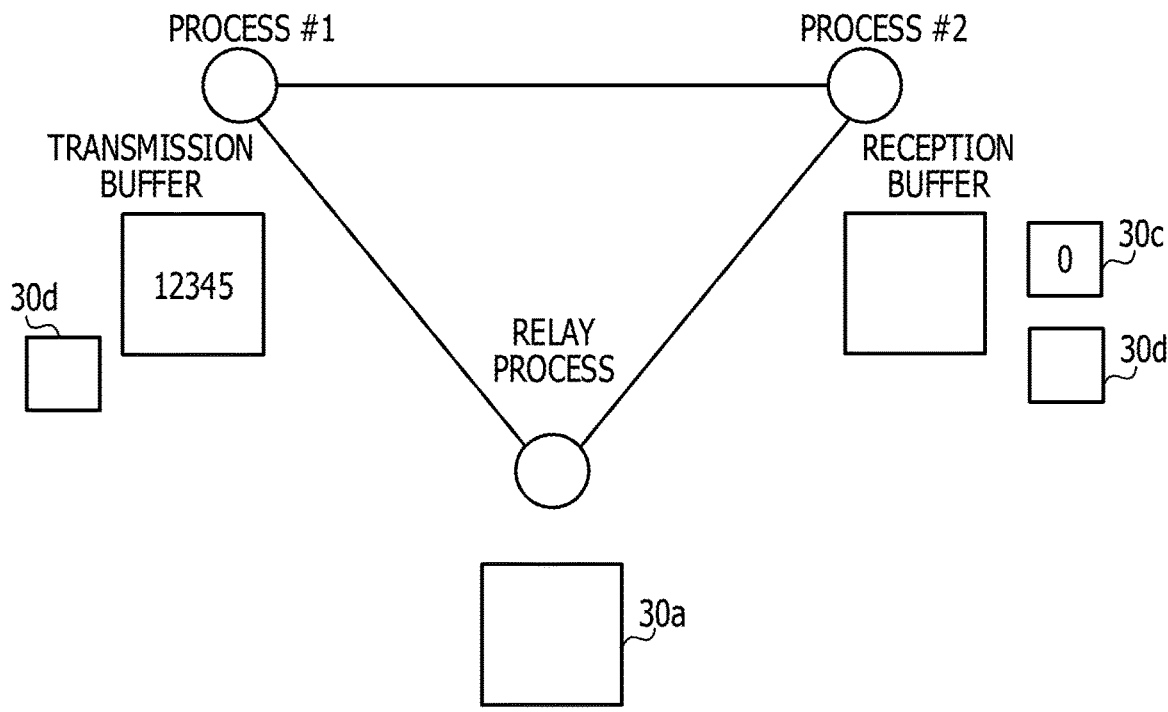
FIG. 3B illustrates an example (start of communication) of transmission and reception performed by the information processing system using the relay buffer.
Figure 3C:
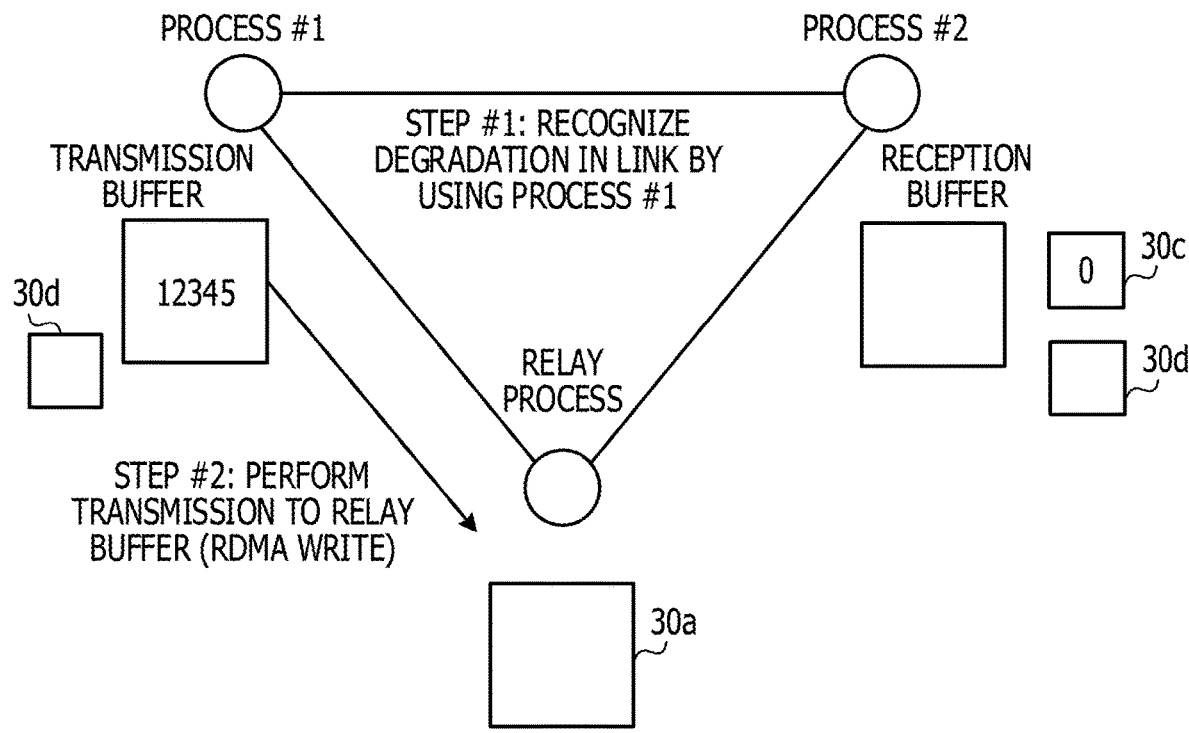
FIG. 3C illustrates an example (copying data of a transmission process) of transmission and reception performed by the information processing system using the relay buffer.

At the start of communication, as illustrated in FIG. 3B, the transmission buffer stores a message "12345". The process #1 recognizes degradation in the link as illustrated in FIG. 3C (step #1). Accordingly, the process #1 transmits the message "12345" in the transmission buffer to the relay buffer 30a (step #2). The process #1 transmits, by using the relay node information 30d, to the relay buffer 30a the message "12345" by performing RDMA WRITE for the message "12345". Since the message is written to the relay buffer 30a by performing RDMA WRITE, the relay process remains in a sleep state without performing any operation.

Figure 3D:
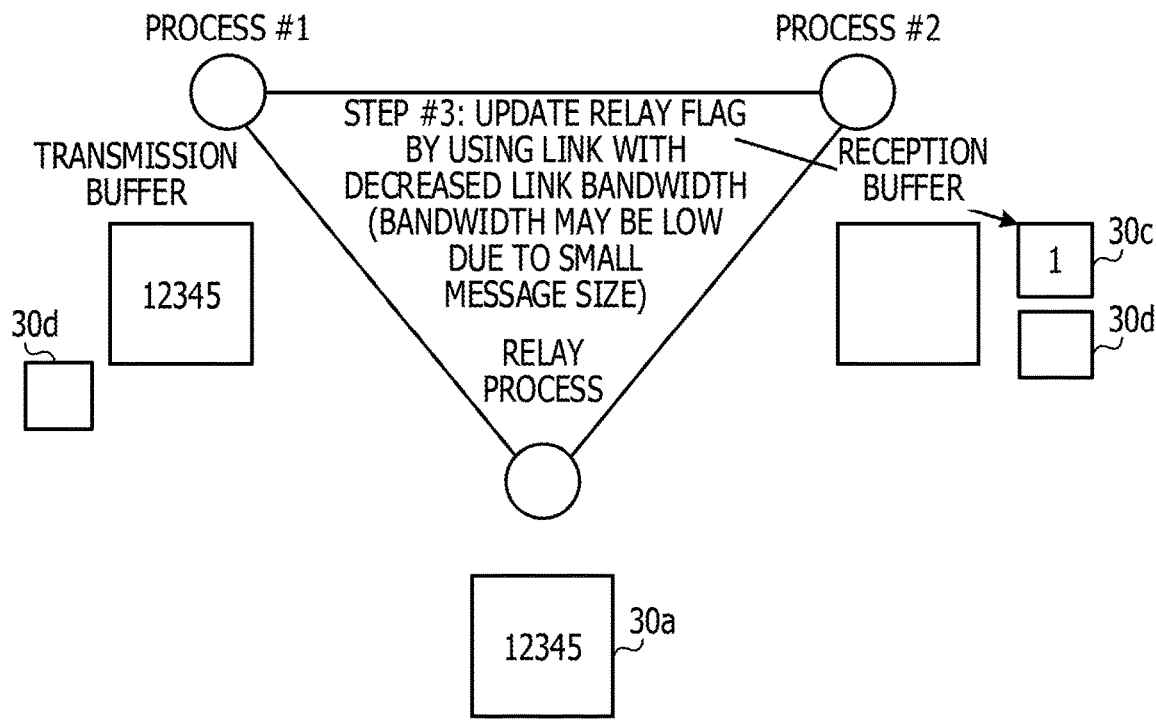
FIG. 3D illustrates an example (notifying a reception process of the start of copy) of transmission and reception performed by the information processing system using the relay buffer.

As illustrated in FIG. 3D, the process #1 notifies the process #2 of the start of copying data to the relay buffer 30a. The process #1 updates the relay flag 30c to "1" by using the degraded link 5 (step #3). Because the size of the message used to update the relay flag 30c is relatively small, the bandwidth may be low.

Figure 3E:
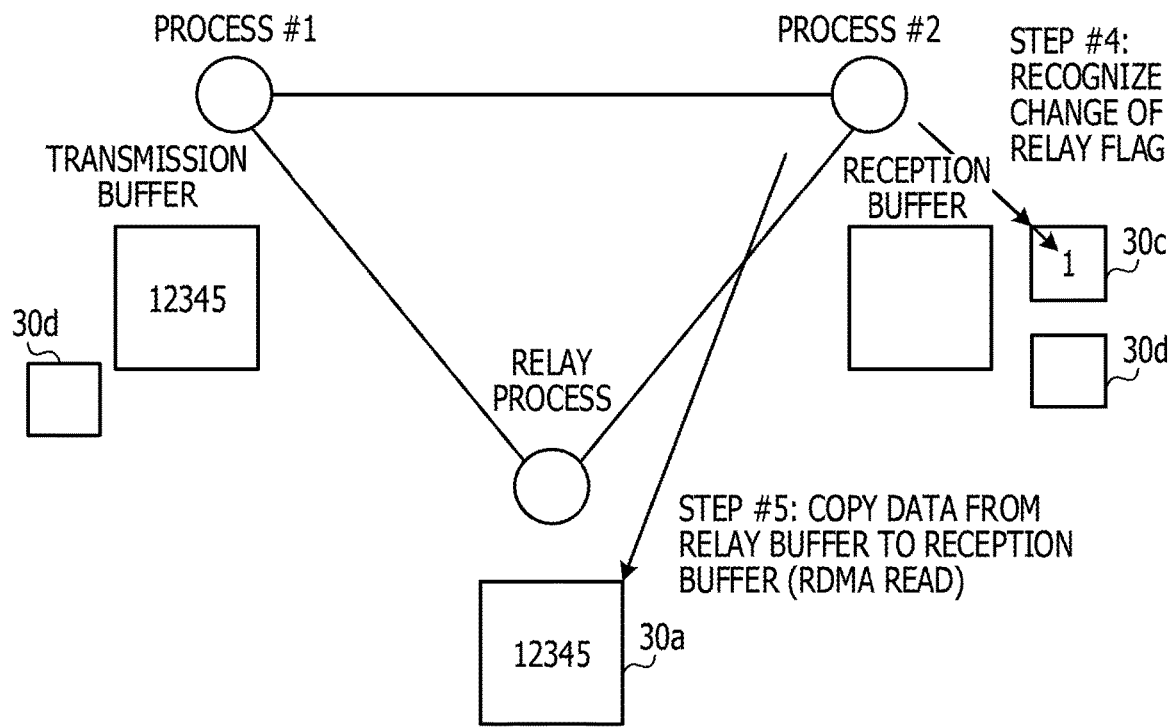
FIG. 3E illustrates an example (copying data of a reception process) of transmission and reception performed by the information processing system using the relay buffer.
Figure 3F:
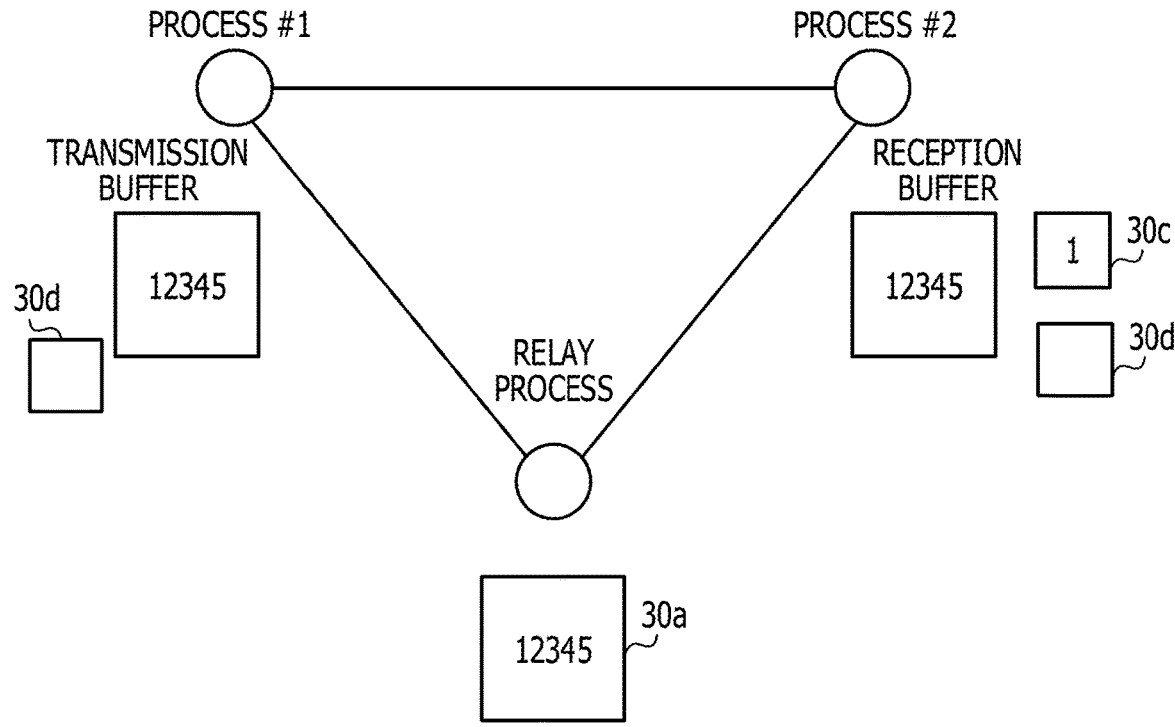
FIG. 3F illustrates an example (end of communication) of transmission and reception performed by the information processing system using the relay buffer.

As illustrated in FIG. 3E, the process #2 recognizes the change of the relay flag 30c (step #4). The process #2 then copies data from the relay buffer 30a to the reception buffer (step #5). The process #2 reads the message "12345" in the relay buffer 30a by performing RDMA READ by using the relay node information 30d and writes the message "12345" to the reception buffer. At the end of communication, as illustrated in FIG. 3F, the reception buffer stores the message "12345".

Figure 4:
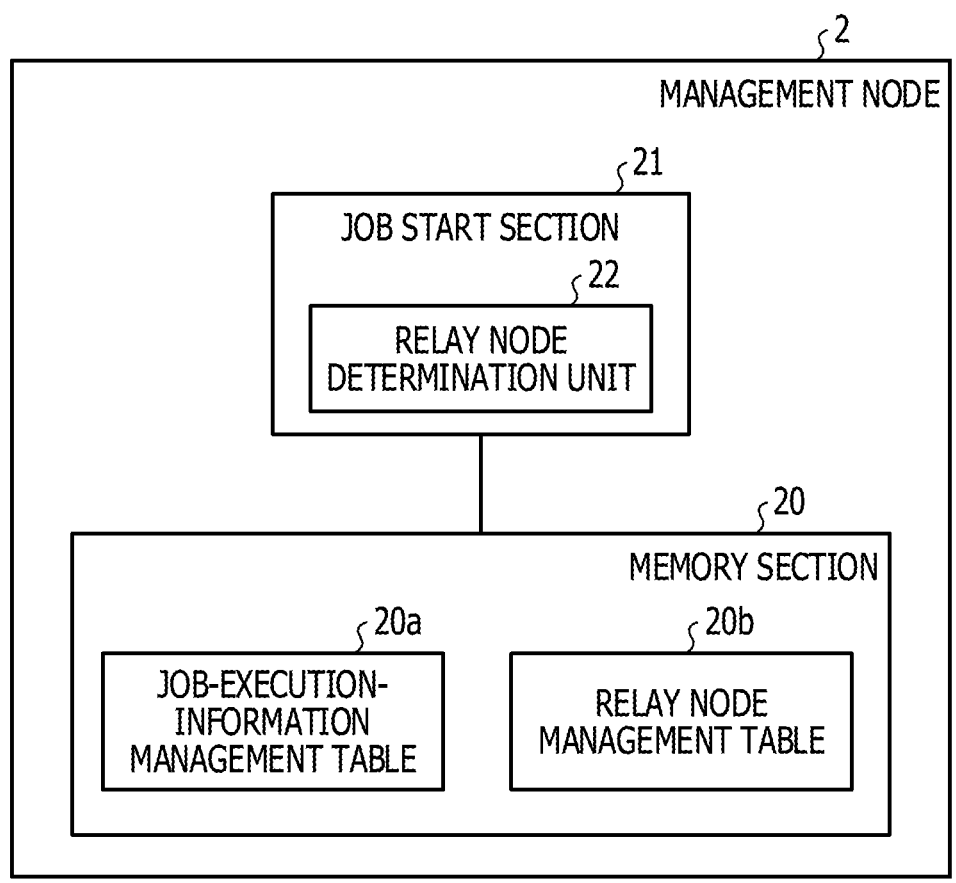
FIG. 4 is a block diagram illustrating a functional configuration of a management node.

Next, functional configurations of the management node 2 and the compute node 3 are described with reference to FIGS. 4 to 8. FIG. 4 is a block diagram illustrating a functional configuration of the management node 2. As illustrated in FIG. 4, the management node 2 includes a memory section 20 and a job start section 21.

The memory section 20 stores a job-execution-information management table 20a and a relay node management table 20b. The job-execution-information management table 20a is used for managing information about job execution. FIG. 5 illustrates an example of the job-execution-information management table 20a. As illustrated in FIG. 5, a job name, a name of node for use, the maximum amount of memory, and an execution time are registered for each job in the job-execution-information management table 20a.

The job name is a name for identifying a job. The name of node for use is the name of the compute node 3 used by a job. The maximum amount of memory is the maximum amount of the memory in the compute node 3 used by a job. The execution time is the execution time of a job. For example, the job identified as job A uses a node #1 and a node #2 and uses memory of up to 100 megabytes (MB) in the compute node 3, and the execution time is 20 minutes.

The relay node management table 20b is a table for managing information about the relay node used by a job. FIG. 6 illustrates an example of the relay node management table 20b. As illustrated in FIG. 6, a target job name, a relay node name, and a buffer size are registered for each job in the relay node management table 20b.

The target job name is a name for identifying a job that uses the relay buffer 30a. The relay node name is a name for identifying the compute node 3 having the relay buffer 30a. The buffer size is the size of the relay buffer 30a. For example, the job identified as job A uses the relay buffer 30a with a size of 100 MB in a node #3.

The job start section 21 determines the relay node, designates the compute node 3 and the relay node for executing a job, and starts the job. The job start section 21 includes a relay node determination unit 22. The relay node determination unit 22 determines the relay node by referring to the job-execution-information management table 20a and registers the information about the relay node in the relay node management table 20b.

Figure 7:
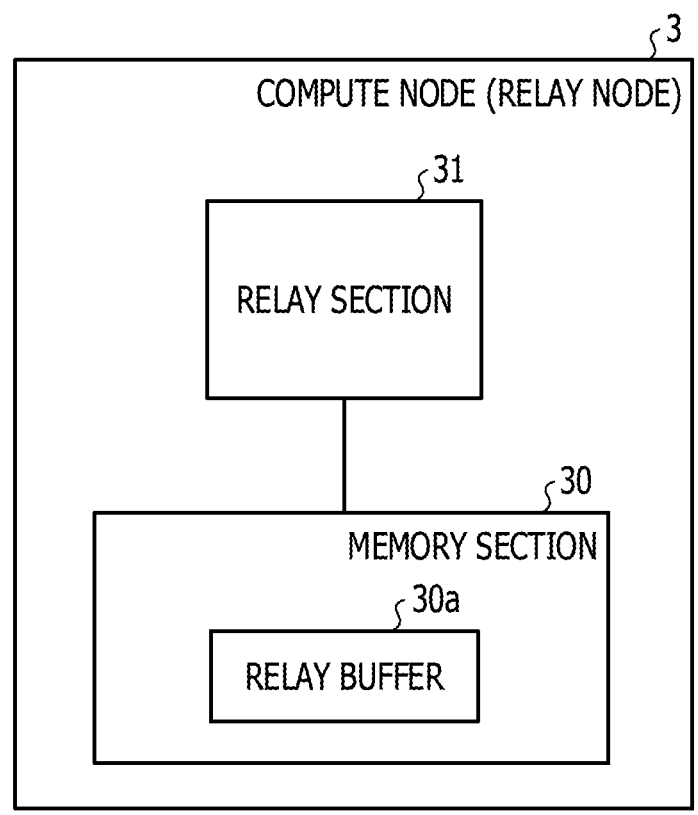
FIG. 7 is a block diagram illustrating a functional configuration of a compute node that operates as the relay node.

FIG. 7 is a block diagram illustrating a functional configuration of the compute node 3 that operates as the relay node. As illustrated in FIG. 7, the compute node 3 that operates as the relay node has a memory section 30 and a relay section 31 for each job.

The memory section 30 includes the relay buffer 30a. The relay section 31 obtains the relay buffer 30a in the memory section 30 and transmits the information for RDMA communication to all job execution processes that use the relay buffer 30a. Here, the job execution process is a process that executes a job, which corresponds to the process #1 and the process #2 illustrated in FIGS. 3A to 3F. When transmitting a message, the job execution process is the transmission process illustrated in FIG. 1, and when receiving a message, the job execution process is the reception process illustrated in FIG. 1. The job execution process accesses the address specified by Raddress in the memory of the relay node specified the host information with Rkey. The relay section 31 corresponds to the relay process illustrated in FIGS. 3A to 3F.

Figure 8:
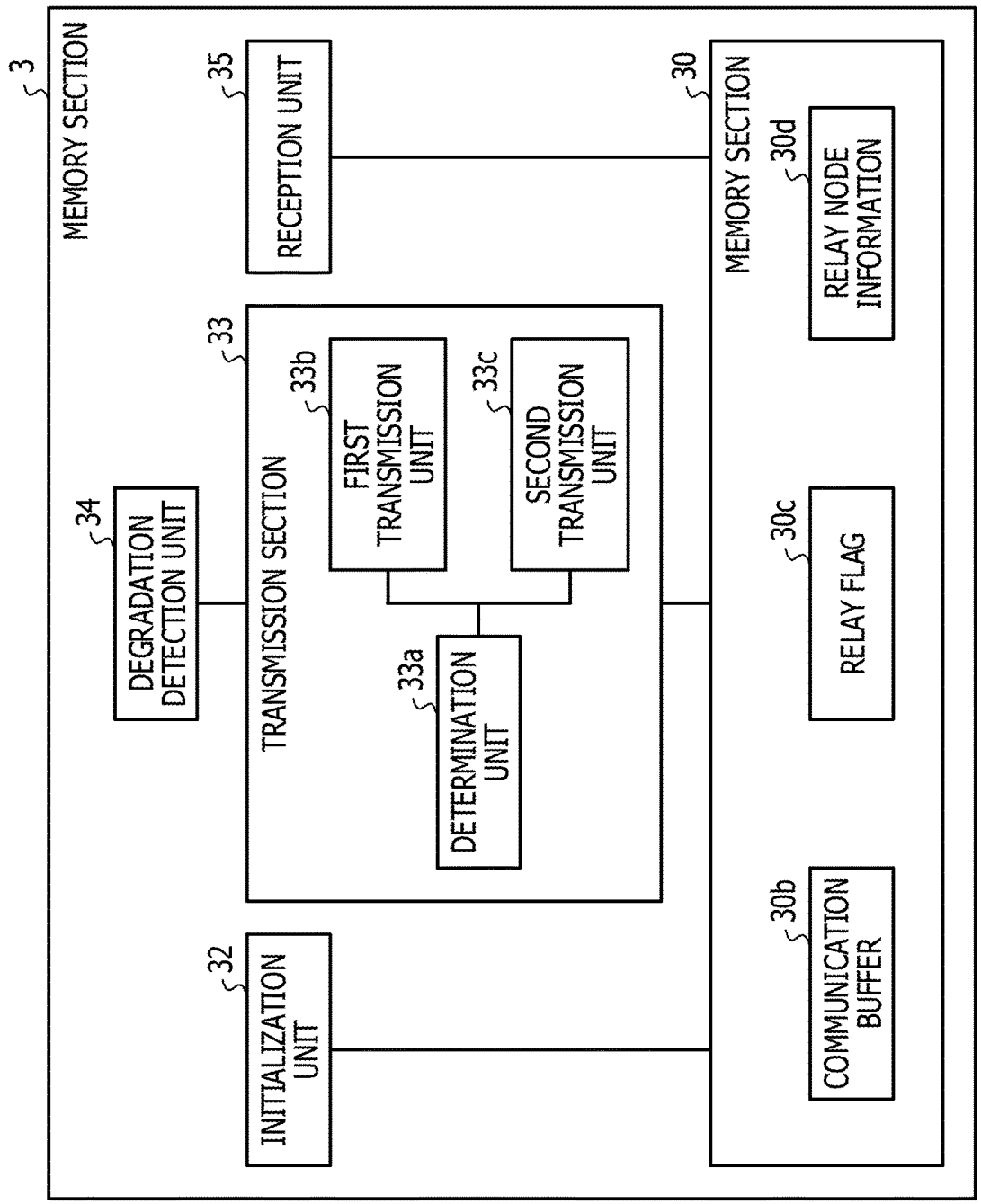
FIG. 8 is a block diagram illustrating a functional configuration of the compute node that executes a job.

FIG. 8 is a block diagram illustrating a functional configuration of the compute node 3 that executes a job. As illustrated in FIG. 8, the compute node 3 that executes a job has the memory section 30, an initialization unit 32, a transmission section 33, a degradation detection unit 34, and a reception unit 35 for each job.

The memory section 30 includes a communication buffer 30b. The communication buffer 30b is used for communication with other compute nodes 3. The communication buffer 30b includes the transmission buffer and the reception buffer. The memory section 30 stores the relay flag 30c and the relay node information 30d.

The initialization unit 32 initializes a message passing interface (MPI) library when a job is started, receives the information for RDMA communication from the relay node, and stores the information for RDMA communication in the memory section 30 as the relay node information 30d. The MPI library is used for communication between the compute nodes 3. The job execution process accesses the address specified by Raddress in the memory of the relay node specified by the host information with Rkey. The initialization unit 32 corresponds to the initialization processing of the job execution process.

The transmission section 33 transmits a message to the reception node. The transmission section 33 corresponds to the transmission process illustrated in FIG. 1. The transmission section 33 includes a determination unit 33a, a first transmission unit 33b, and a second transmission unit 33c.

When degradation in the link 5 is detected by the degradation detection unit 34, the determination unit 33a determines whether the size of the message to be transmitted is 512 bytes or less. In a case where the size of the message to be transmitted is more than 512 bytes, the determination unit 33a instructs the first transmission unit 33b to transmit the message. In a case where the size of the message to be transmitted is 512 bytes or less, the determination unit 33a instructs the second transmission unit 33c to transmit the message. Furthermore, in a case where degradation in the link 5 is not detected by the degradation detection unit 34, the determination unit 33a instructs the second transmission unit 33c to transmit the message.

The first transmission unit 33b transmits the message to the reception node by using the relay buffer 30a. The first transmission unit 33b writes the message to the relay buffer 30a by performing RDMA WRITE. In addition, the first transmission unit 33b updates the relay flag 30c in the reception node. The second transmission unit 33c transmits the message to the reception node without using the relay buffer 30a.

The degradation detection unit 34 monitors the link 5 and notifies the transmission section 33 of the occurrence of degradation in the link 5 when degradation occurs in the link 5. The degradation detection unit 34 detects degradation in the link 5 by obtaining the status of a port.

The reception unit 35 receives the message transmitted from the transmission node. The reception unit 35 corresponds to the reception process illustrated in FIG. 1. In a case where the relay flag 30c is updated to "1", the reception unit 35 copies data from the relay buffer 30a to the reception buffer by performing RDMA READ.

Each of the compute nodes 3 is operable as a relay node and also has a function of executing a job. Hence, each of the compute nodes 3 has both the function illustrated in FIG. 7 and the function illustrated in FIG. 8.

Figure 9:
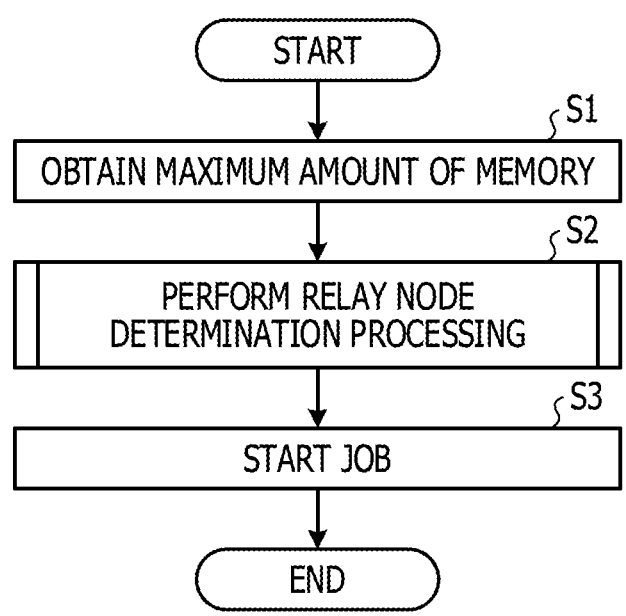
FIG. 9 is a flowchart illustrating a flow of job start processing performed by the management node.

Next, a flow of job start processing performed by the management node 2 is described. FIG. 9 is a flowchart illustrating a flow of job start processing performed by the management node 2. The job start processing performed by the management node 2 is carried out as part of the processing performed by the job scheduler controller 2a illustrated in FIG. 2.

As illustrated in FIG. 9, the management node 2 obtains the maximum amount of memory for a job to be started from the job-execution-information management table 20a (step S1) and performs relay node determination processing while using the obtained maximum amount of memory as the desired amount of the relay buffer 30a (step S2).

Subsequently, the management node 2 starts the job (step S3). In response to the start of the job carried out by the management node 2, the compute node 3 to perform the job carries out initialization processing and executes the job. The relay node also performs initialization processing.

Figure 10:
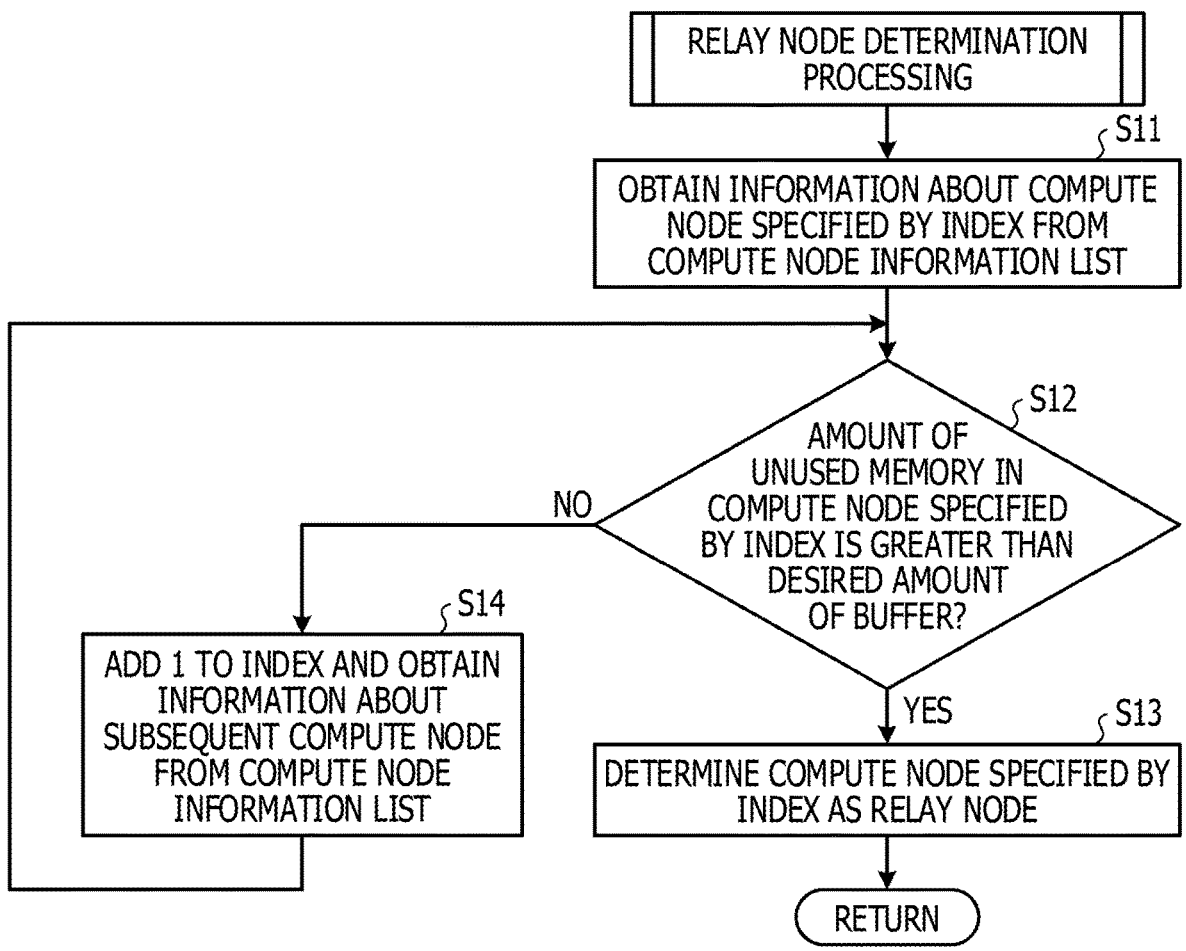
FIG. 10 is a flowchart illustrating a flow of relay node determination processing.

FIG. 10 is a flowchart illustrating a flow of relay node determination processing. As illustrated in FIG. 10, the management node 2 obtains information about the compute node 3 specified by an index from a compute node information list (step S11). Here, the compute node information list is a list of information about the respective compute node 3. The information about the compute node 3 includes the amount of unused memory. The index is initialized to 1.

The management node 2 determines whether the amount of unused memory in the compute node 3 specified by the index is greater than the desired amount of buffer (step S12). In a case where the amount of unused memory is greater than the desired amount of buffer, the management node 2 determines the compute node 3 specified by the index as the relay node (step S13). Conversely, in a case where the amount of unused memory is not greater than the desired amount of buffer, the management node 2 adds 1 to the index, and obtains information about the subsequent compute node 3 from the compute node information list (step S14). The processing flow then returns to step S12.

As described above, by determining the relay node when the management node 2 starts a job, the compute node 3 that executes the job may perform communication using the relay node when degradation occurs in the link 5 that is used for communication.

Figure 11:
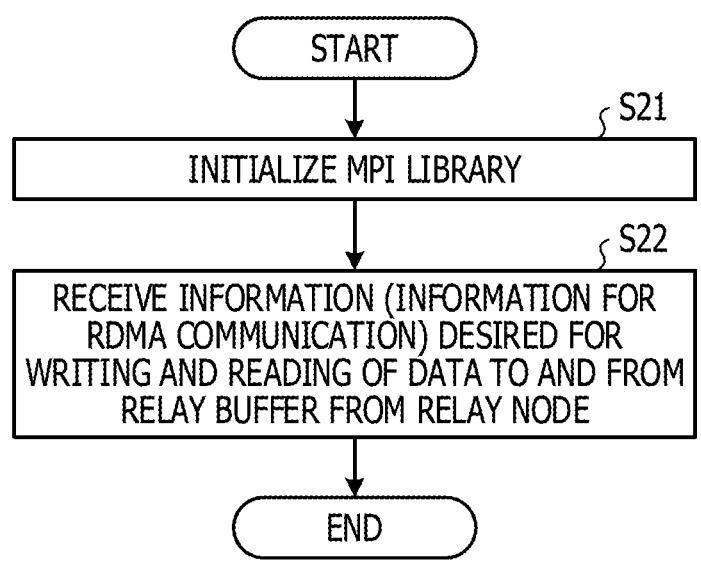
FIG. 11 is a flowchart illustrating a flow of initialization processing performed by a job execution process.

Next, flows of processing operations performed by the compute node 3 are described with reference to FIGS. 11 to 14. FIG. 11 is a flowchart illustrating a flow of initialization processing performed by the job execution process. The job execution process is invoked by the job scheduler daemon 3a illustrated in FIG. 2.

As illustrated in FIG. 11, the job execution process initializes the MPI library (step S21). The job execution process then receives from the relay process the information (the information for RDMA communication) desired for writing and reading of data to and from the relay buffer 30a and stores in the memory section 30 the information as the relay node information 30d (step S22).

As described above, in the initialization processing, the job execution process receives from the relay process the information desired for writing and reading of data to and from the relay buffer 30a and stores in the memory section 30 the information as the relay node information 30d, and therefore the job execution process may perform communication using the relay buffer 30a.

Figure 12:
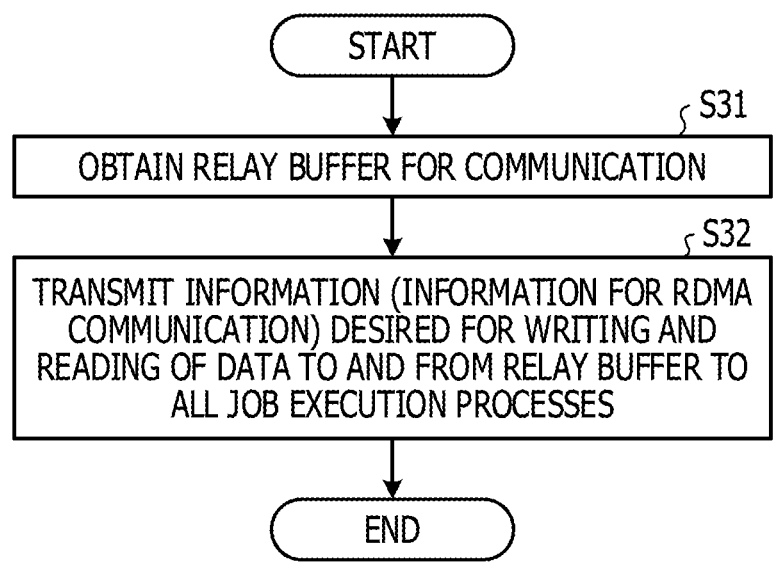
FIG. 12 is a flowchart illustrating a flow of initialization processing performed by a relay process.

FIG. 12 is a flowchart illustrating a flow of initialization processing performed by the relay process. The relay process is invoked by the job scheduler daemon 3a illustrated in FIG. 2. As illustrated in FIG. 12, the relay process obtains the relay buffer 30a for communication (step S31). The relay process then transmits the information (the information for RDMA communication) desired for writing and reading of data to and from the relay buffer 30a to all job execution processes (step S32).

As described above, the relay process obtains the relay buffer 30a and transmits the information desired for writing and reading of data to and from the relay buffer 30a to the job execution process, and therefore the job execution process performs communication using the relay buffer 30a.

Figure 13:
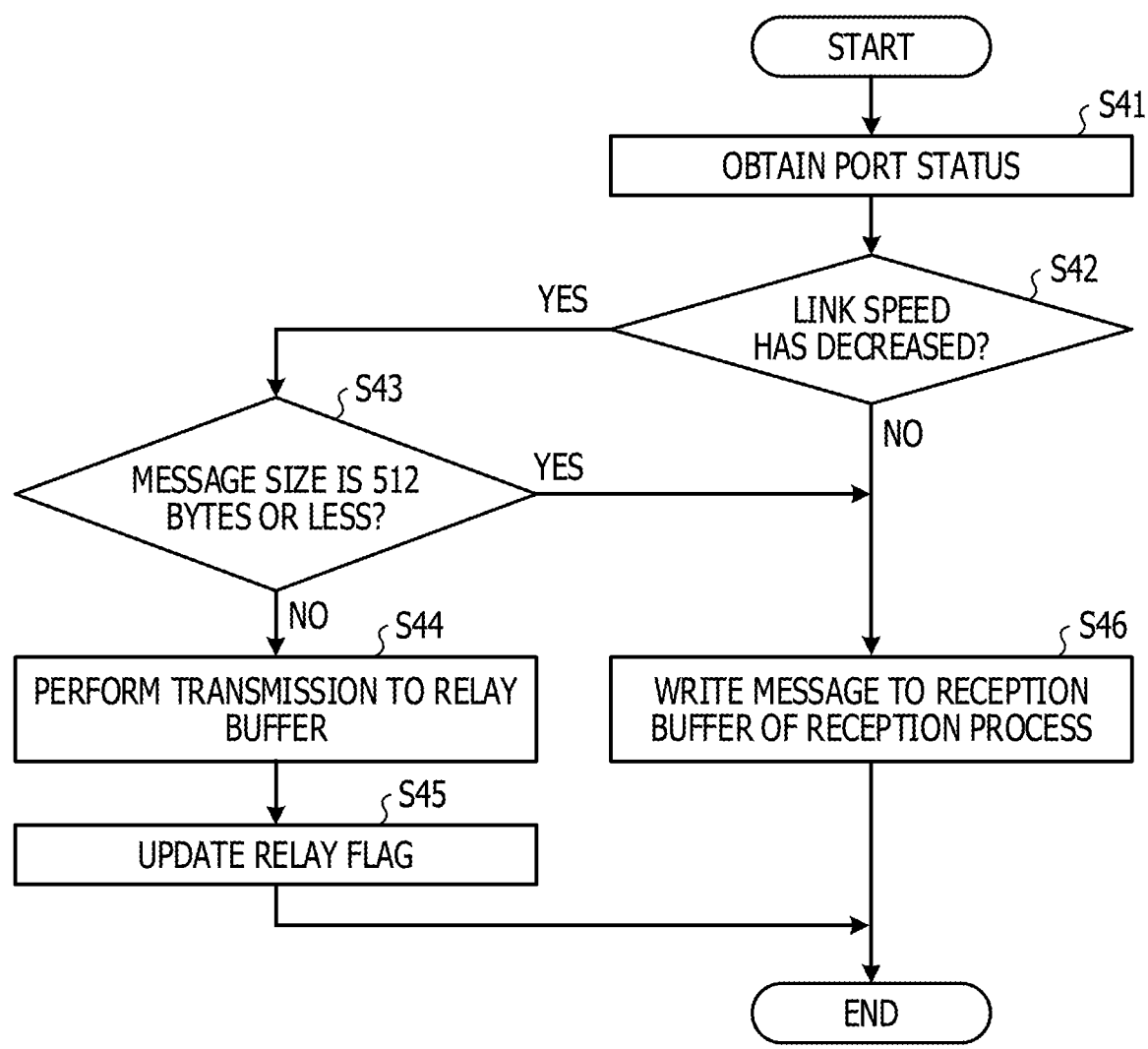
FIG. 13 is a flowchart illustrating a flow of processing performed by a transmission process.

FIG. 13 is a flowchart illustrating a flow of the processing performed by the transmission process. As illustrated in FIG. 13, the transmission process obtains the status of a port (step S41). Here, the status of a port includes the speed of the link 5 connected to the port.

The transmission process determines whether the speed of the link 5 has decreased (step S42). In a case where the speed has decreased, the transmission process further determines whether the size of the message is 512 bytes or less (step S43). In a case where the size of the message is more than 512 bytes, the transmission process transmits the message to the relay buffer 30a (step S44) and updates the relay flag 30c to "1" (step S45).

Conversely, in a case where the size of the message is 512 bytes or less or in a case where the speed of the link 5 has not decreased, the transmission process writes the message to the reception buffer of the reception process (step S46).

As described above, in a case where the speed of the link 5 has decreased and the size of the message is more than 512 bytes, the transmission process transmits the message to the relay buffer 30a, thereby suppressing the occurrence of degradation of communication performance.

Figure 14:
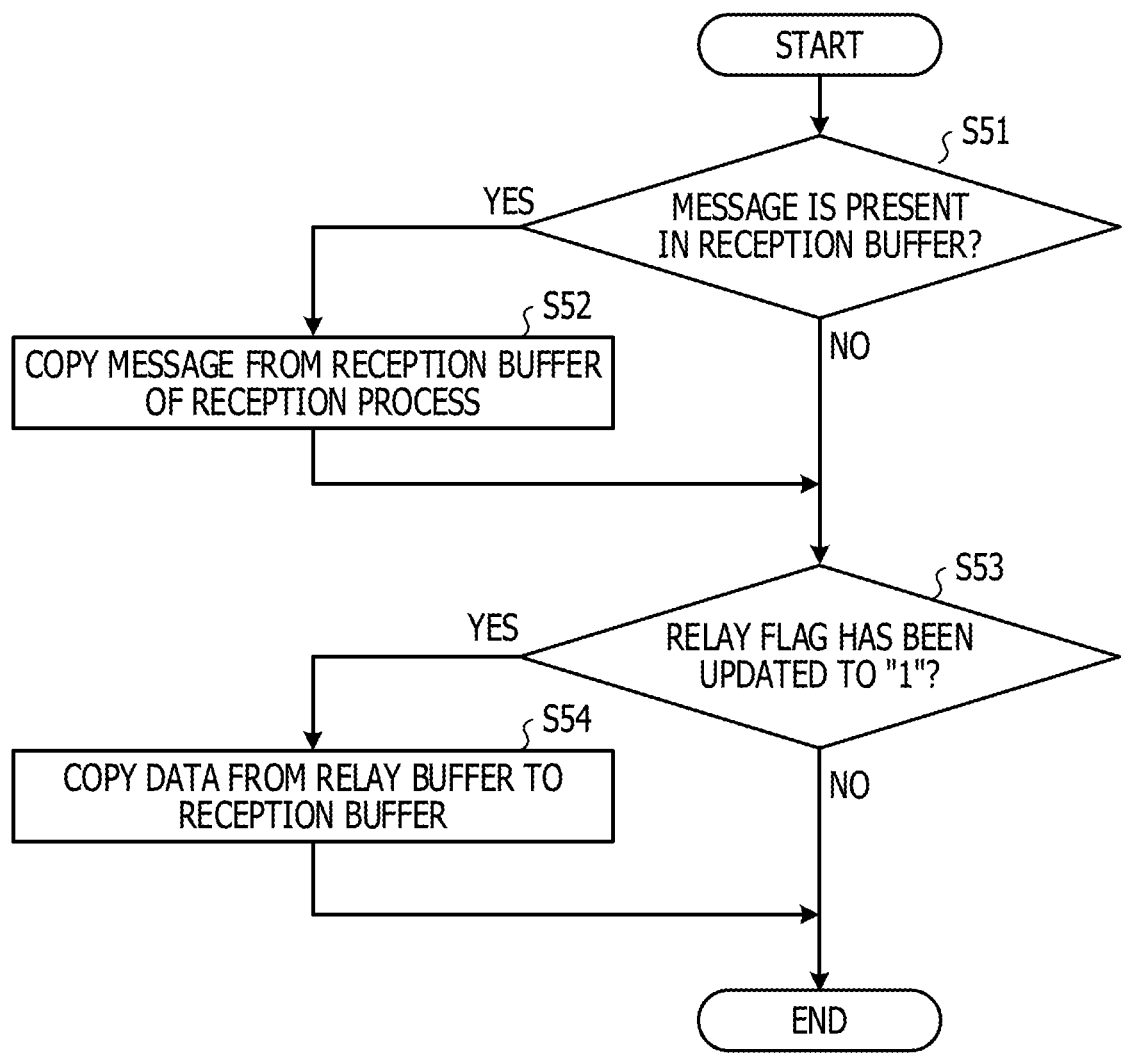
FIG. 14 is a flowchart illustrating a flow of processing performed by a reception process.

FIG. 14 is a flowchart illustrating a flow of processing performed by the reception process. As illustrated in FIG. 14, the reception process determines whether a message is present in the reception buffer (step S51). In a case where a message is present in the reception buffer, the reception process copies the message from the reception buffer of the reception process (step S52).

Subsequently, the reception process determines whether the relay flag 30c has been updated to "1" (step S53). In a case where the relay flag 30c has been updated to "1", the reception process copies data from the relay buffer 30a to the reception buffer (step S54).

As described above, in a case where the relay flag 30c has been updated to "1", the reception process copies data from the relay buffer 30a, so that the reception process receives the message transmitted by the transmission process via the relay buffer 30a.

Figure 15:
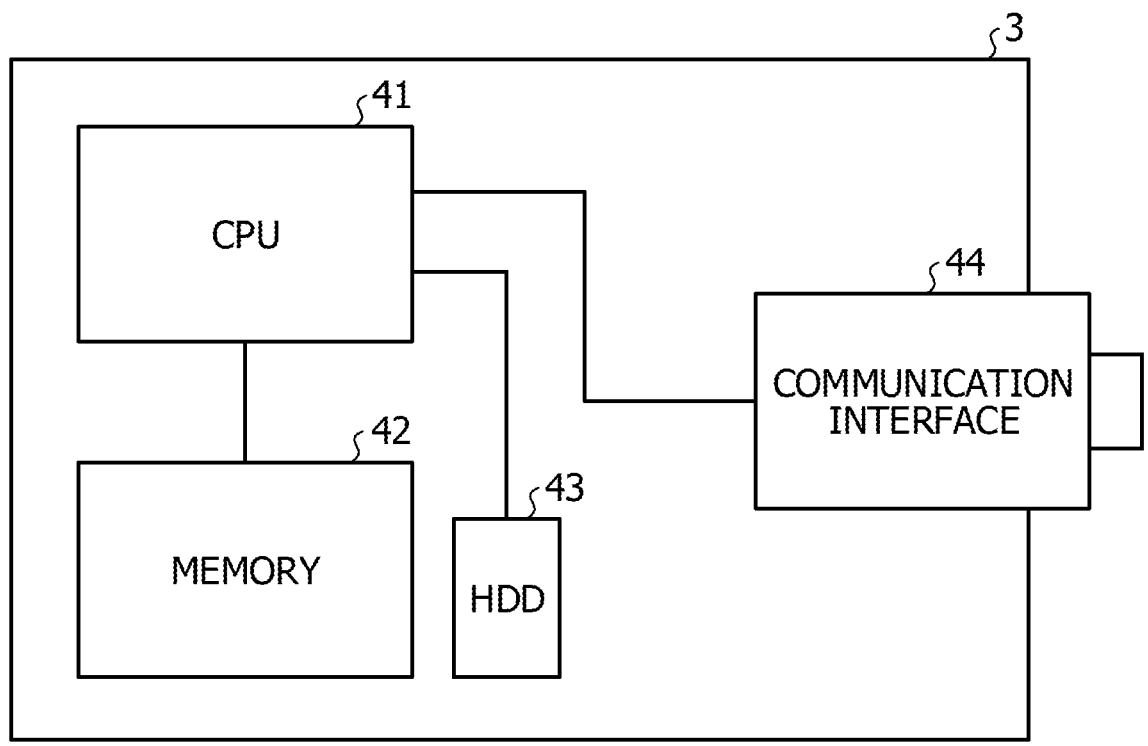
FIG. 15 is a block diagram illustrating a hardware configuration of the compute node.

Next, a hardware configuration of the compute node 3 is described. FIG. 15 is a block diagram illustrating a hardware configuration of the compute node 3. As illustrated in FIG. 15, the compute node 3 includes a central processing unit (CPU) 41, a memory 42, a hard disk drive (HDD) 43, and a communication interface 44.

The CPU 41 reads a program in the memory 42 and executes the program. The function of the relay section 31, which is illustrated in FIG. 7, and the functions of the initialization unit 32, the transmission section 33, the degradation detection unit 34, and the reception unit 35, which are illustrated in FIG. 8, are implemented by the CPU 41 executing a program as processes.

The memory 42 is a random access memory (RAM) that stores a program and resultant data obtained during execution of the program. The HDD 43 is a disk drive that stores a program and data. The communication interface 44 is for communicating the others of the compute nodes 3. The communication interface 44 has a port connected to the link 5 and stores the communication speed of the port.

The program executed on the compute node 3 is stored in a digital versatile disk (DVD), which is an example of a storage medium from which the compute node 3 is capable of reading data. The program is read from the DVD and installed on the compute node 3. Alternatively, the program executed on the compute node 3 is stored on, for example, a database in a computer system connected via a network. The program is read from the database and installed on the compute node 3. The installed program is stored in the HDD 43, loaded into the memory 42 and executed by the CPU 41.

As described above, in this embodiment, when the degradation detection unit 34 detects degradation in the connected link 5, the degradation detection unit 34 notifies the transmission section 33 of the degradation. After the degradation in the connected link 5 is reported, the determination unit 33a of the transmission section 33 determines whether the size of the message is 512 bytes or less. In a case where it is determined that the size of the message is more than 512 bytes, the first transmission unit 33b of the transmission section 33 transmits the message to the relay buffer 30a. By contrast, in a case where it is determined that the size of the message is 512 bytes or less, the second transmission unit 33c of the transmission section 33 transmits the message by using the degraded link 5. As a result, even if where degradation occurs in the link 5 connected to the destination compute node 3, the information processing system 1 may transmit a message to the destination compute node 3 while reducing the effect of degradation.

Furthermore, in this embodiment, the first transmission unit 33b writes a message to the relay buffer 30a by performing RDMA WRITE, and therefore the message may be transmitted to the relay buffer 30a without burdening the relay node.

Moreover, in this embodiment, when the compute node 3 is selected as the relay node, the relay section 31 of the compute node 3 obtains the relay buffer 30a and transmits the information desired for writing and reading of data to and from the relay buffer 30a to all job execution processes. Hence, the job execution process performs communication using the relay buffer 30a.

It is noted that, although a single relay node is used in the description of the embodiment, the information processing system 1 may use multiple relay nodes. When multiple relay nodes are employed, the relay buffer 30a is equally divided for the multiple relay nodes. The management node 2 determines the multiple compute nodes 3 as the multiple relay nodes. The relay nodes each transmit the information desired for writing and reading of data to and from the relay buffer 30a to all job execution nodes. Using multiple relay nodes enables distribution of load for communication via the relay node and reduction of the size of each of the relay buffers.

Further, although the connection form of the compute nodes 3 is a single-layer full-mesh topology in the description of the embodiment, the connection form of the compute nodes 3 may be another type of topology such as a multi-layer full-mesh topology.

Figure 16:
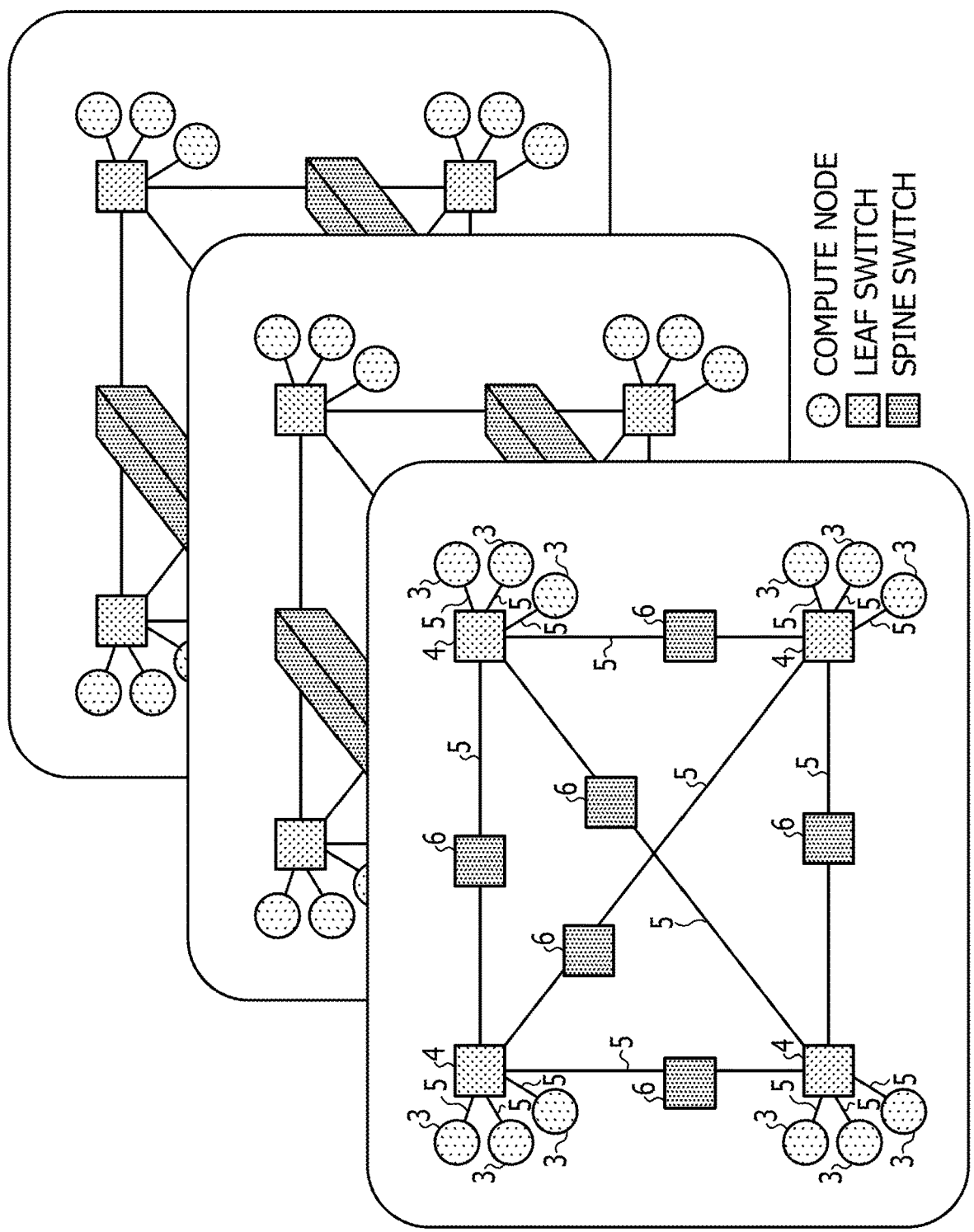
FIG. 16 illustrates a multi-layer full-mesh topology.

FIG. 16 illustrates an example of the multi-layer full-mesh topology. As illustrated in FIG. 16, in the multi-layer full-mesh topology, spine switches 6 are provided on links between switches so as to connect multiple single-layer full-mesh topologies. The switch 4 connected to the compute node 3 by the link is referred to as a leaf switch.

Moreover, although it is determined whether to use the relay buffer 30a when degradation occurs in a link in the embodiment, the transmission process may determine whether to use the relay buffer 30a in accordance with the load of link when communication is started.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus, comprising:
a memory; and
a processor coupled to the memory and configured to:
obtain a maximum amount of memory for a job to be started, as a desired amount of buffer,
determine, for each of a plurality of compute nodes, whether an amount of unused memory in a compute node is greater than the desired amount of buffer,
determine the compute node as a relay node when it is determined that the amount of unused memory is greater than the desired amount of buffer,
start the job,
determine whether a size of data is equal to a predetermined threshold or less when degradation occurs on a communication path to a destination compute node of the data;
transmit the data to the determined relay node coupled to the destination compute node when it is determined that the size of the data is more than the predetermined threshold; and transmit the data to the destination compute node through the communication path when it is determined that the size of the data is the predetermined threshold or less.

2. The information processing apparatus according to claim 1, wherein the processor is configured to transmit the data to a relay buffer in accordance with relay buffer information that is information about the relay buffer obtained in the determined relay node, that is transmitted from the determined relay node, and that is used for accessing the relay buffer.

3. The information processing apparatus according to claim 2, wherein
a plurality of partial buffers acquired by dividing the relay buffer are obtained in a plurality of another compute nodes different from the destination compute node, and
the processor is configured to divide the data and transmit the divided data to the plurality of partial buffers in accordance with a plurality of partial buffer information about the plurality of partial buffers and that are transmitted from the plurality of another compute nodes.

4. The information processing apparatus according to claim 2, wherein the processor is configured to transmit the data to the relay buffer by performing remote direct memory access.

5. The information processing apparatus according to claim 2, wherein the processor is configured to obtain a relay buffer and that transmits relay buffer information about the relay buffer to another compute node to perform communication using the relay buffer when the information processing apparatus is selected for relaying data when degradation occurs on the communication path.

6. The information processing apparatus according to claim 1, wherein the information processing apparatus is coupled to the plurality of compute nodes in a full-mesh topology.

7. The information processing apparatus according to claim 1, wherein the degradation occurs when a part of lanes in a multilane link between the information processing device and the destination information processing device is failed.

8. The information processing apparatus according to claim 7, wherein the degradation occurs when a link in use for communication between the information processing device and the destination information processing device is also used for another communication.

9. The information processing apparatus according to claim 1, wherein the processor is configured to obtain the maximum amount of memory for the job from job management information in which a job name, a name of node for use, the maximum amount of memory, and an execution time are associated with each other for each of a plurality of jobs.

10. A system, comprising:
a plurality of compute nodes; and
a management apparatus coupled to the compute nodes by a network and configured to manage the plurality of information processing apparatuses,
the management apparatus is configured to
select a third compute node which is used when degradation occurs on a communication path, the communication path being used when a first compute node transmits data to a second compute node, and
the first compute node includes a first processor configured to:

obtain a maximum amount of memory for a job to be started, as a desired amount of buffer,
determine, for each of the plurality of compute nodes, whether an amount of unused memory in a compute node is greater than the desired amount of buffer,
determine the compute node as a relay node when it is determined that the amount of unused memory is greater than the desired amount of buffer,
start the job,
determine whether a size of data is equal to a predetermined threshold or less when degradation occurs on a communication path to a destination compute node of the data,
transmit the data to the determined relay node coupled to the destination compute node when it is determined that the size of the data is more than the predetermined threshold, and
transmit the data to the destination compute node through the communication path when it is determined that the size of the data is the predetermined threshold or less, and the second compute node includes a second processor configured to:
acquire the data from the third compute node when the degradation occurs on the communication path and when the size of the data is more than the predetermined threshold, and
receive the data from the first compute node when the degradation occurs on the communication path and when the size of the data is not more than the predetermined threshold.

11. An information processing method executed by a processor of an information processing apparatus, the information processing method comprising:
obtaining a maximum amount of memory for a job to be started, as a desired amount of buffer;
determining, for each of a plurality of compute nodes, whether an amount of unused memory in a compute node is greater than the desired amount of buffer;
determining the compute node as a relay node when it is determined that the amount of unused memory is greater than the desired amount of buffer;
starting the job;
determining whether a size of data is equal to a predetermined threshold or less when degradation occurs on a communication path to a destination compute node of the data;
transmitting the data to the determined relay node coupled to the destination compute node when it is determined that the size of the data is more than the predetermined threshold; and
transmitting the data to the destination compute node through the communication path when it is determined that the size of the data is the predetermined threshold or less.

12. The information processing method according to claim 11, wherein the transmitting the data to the determined relay node includes transmitting the data to a relay buffer in accordance with relay buffer information that is information about the relay buffer obtained in the determined relay node, that is transmitted from the determined relay node, and that is used for accessing the relay buffer.

13. The information processing method according to claim 12, wherein a plurality of partial buffers acquired by dividing the relay buffer are obtained in a plurality of another compute nodes different from the destination compute node, and the transmitting the data to the determined relay node includes dividing the data and transmitting the divided data to the plurality of partial buffers in accordance with a plurality of partial buffer information about the plurality of partial buffers and that are transmitted from the plurality of another compute nodes.

14. The information processing method according to claim 12, wherein the transmitting the data to the determined relay node includes transmitting the data to the relay buffer by performing remote direct memory access.

15. The information processing method according to claim 12, wherein the transmitting the data to the determined relay node includes obtaining a relay buffer and transmitting relay buffer information about the relay buffer to another compute node to perform communication using the relay buffer when the information processing apparatus is selected for relaying data when degradation occurs on the communication path.

16. The information processing method according to claim 11, wherein the information processing apparatus is coupled to the plurality of compute nodes in a full-mesh topology.

17. A non-transitory computer-readable storage medium storing a program that causes a processor included in an information processing apparatus to execute a process, the process comprising:

obtaining a maximum amount of memory for a job to be started, as a desired amount of buffer;

determining, for each of a plurality of compute nodes, whether an amount of unused memory in a compute node is greater than the desired amount of buffer;

determining the compute node as a relay node when it is determined that the amount of unused memory is greater than the desired amount of buffer;

starting the job;

determining whether a size of data is equal to a predetermined threshold or less when degradation occurs on a communication path to a destination compute node of the data;

transmitting the data to the determined relay node coupled to the destination compute node when it is determined that the size of the data is more than the predetermined threshold; and transmitting the data to the destination compute node through the communication path when it is determined that the size of the data is the predetermined threshold or less.

* * * * *